United States Patent [19]
Itoh et al.

[11] Patent Number: 5,845,728
[45] Date of Patent: Dec. 8, 1998

[54] BODY FRAME FOR MOTORCYCLE

[75] Inventors: Hiroyuki Itoh; Ken Yamagutch; Kazuhiro Kawashima, all of Saitama, Japan

[73] Assignee: Honda Giken Kogyo Kabushiki Kaisha, Tokyo, Japan

[21] Appl. No.: 721,957

[22] Filed: Sep. 27, 1996

[30] Foreign Application Priority Data

Sep. 29, 1995 [JP] Japan ................................. 7-276719

[51] Int. Cl.⁶ ................................................. B62K 11/06
[52] U.S. Cl. ........................................ 180/219; 180/311
[58] Field of Search ................................. 180/219, 311, 180/312; 280/274, 281.1

[56] References Cited

U.S. PATENT DOCUMENTS

| | | | |
|---|---|---|---|
| 4,280,582 | 7/1981 | Kouyama et al. | 180/219 |
| 4,427,087 | 1/1984 | Inoue et al. | 180/219 |
| 4,618,019 | 10/1986 | Ando et al. | 180/219 |
| 4,727,953 | 3/1988 | Kudo et al. | 180/219 |
| 4,776,422 | 10/1988 | Sakuma | 180/219 |
| 5,183,130 | 2/1993 | Nakamura et al. | 180/219 |
| 5,480,001 | 1/1996 | Hara | 180/219 |

FOREIGN PATENT DOCUMENTS

| | | |
|---|---|---|
| 2369147 | 5/1978 | France . |
| 2575718 | 7/1986 | France . |
| 60-39350 | 11/1985 | Japan . |
| 329046 | 5/1930 | United Kingdom . |

*Primary Examiner*—Kevin Hurley
*Attorney, Agent, or Firm*—Birch, Stewart. Kolasch & Birch, LLP

[57] ABSTRACT

A body frame for a motorcycle is disclosed wherein a head pipe is provided for pivotally supporting a front fork. A main pipe extends from the head pipe, the main pipe is curved to extend rearwardly and downwardly. A pivot unit is secured to the downwardly extending portion of the main pipe for pivotally supporting a rear swing arm thereon. The main pipe includes a transversely elongated cross section and extends in a vertical plane including a longitudinal axis of the motorcycle. The body frame includes a seat rail for supporting a seat, the seat rail is connected to a rear portion of the main pipe and includes a transversely elongated cross section extending in a vertical plane including the longitudinal axis of the motorcycle. Down tubes are provided for supporting a forward portion of an engine. The down tubes connected to the main pipe include a transversely elongate cross section and extend downwardly from the head pipe in a vertical plane including the longitudinal axis of the motorcycle.

21 Claims, 11 Drawing Sheets

BODY FRAME FOR MOTORCYCLE

BACKGROUND OF THE INVENTION

1. Field of the Invention

The present invention relates to a body frame for a motorcycle, having a curved main pipe extending from a head pipe for pivotally supporting a front fork over an engine to a pivot unit for pivotally supporting a rear swing arm.

2. Description of Related Art

A known body frame for a motorcycle is formed by working a single rectangular pipe and extending the pipe in a vertical plane including the longitudinal axis of the motorcycle.

The body frame for a motorcycle which is disclosed in Japanese Utility Model Publication No. Sho 60-39350 is constructed by extending a single main pipe (1) having a substantially square cross section rearwardly from a head pipe (5) in a vertical plane including the longitudinal axis of the motorcycle and downwardly to a pivot unit for pivotally supporting a rear swing arm. In addition, two parallel seat rails (2) extend rearwardly from a bend in a rear portion of the main pipe (1) and two parallel stay pipes (9) extend between the main pipe (1) and the seat rails (2). Thus, this known body frame has a simple framing.

Since this body frame has a single main pipe, the body frame needs reinforcement to provide the body frame with a high rigidity for withstanding transverse bending and torsional forces acting on the body frame when the body frame is applied to a middle-size or large-size on-road motorcycle and hence it is impossible to make use of the simple framing of the body frame.

SUMMARY AND OBJECTS OF THE INVENTION

Accordingly, it is an object of the present invention to provide a single construction of a body frame having a high rigidity capable of withstanding transverse bending and torsional forces acting on middle-size and large-size on-road motorcycles. With the foregoing object in view, the present invention provides a body frame for a motorcycle, including a main pipe extending over an engine from a head pipe for pivotally supporting a front fork and curved so as to extend downwardly behind the engine to a pivot unit for pivotally supporting a rear swing arm for supporting a rear wheel, wherein the main pipe has a transversely elongated cross section, and extends in a vertical plane including the longitudinal axis of the motorcycle.

The body frame includes the main pipe formed by working a pipe having a transversely elongate cross section, and the main pipe extends in a vertical plane including the longitudinal axis of the motorcycle. Therefore, the body frame has a planar framing that can be easily worked and a high rigidity capable of withstanding transverse bending and torsional forces.

Secondly, the body frame further includes a seat rail for supporting a seat, connected to the rear portion of the main pipe, having a transversely elongated cross section which extends in a vertical plane including the longitudinal axis of the motorcycle.

Since the seat rail connected to the rear portion of the main pipe has a transversely elongated cross section and extends rearwardly in a vertical plane including the longitudinal axis of the motorcycle, the body frame including the seat rail has a simple planar framing and has a high rigidity capable of withstanding transverse bending and torsional forces.

Thirdly, the body frame further includes down tubes for supporting the engine at its front end. The down tubes are connected to the main pipe, having a transversely elongated cross section and extend downwardly from the head pipe in a vertical plane including the longitudinal axis of the motorcycle.

The body frame includes the down tubes for supporting the engine at its front end. The down tubes are connected to the main pipe, having a transversely elongated cross section and extend downwardly from the head pipe in a vertical plane including the longitudinal axis of the motorcycle. The body frame including the down tubes has a simple planar framing and has a high rigidity capable of withstanding transverse bending and torsional forces.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 11(*a*) and 11(*b*) are perspective views of modifications of the embodiments of the present invention;

DESCRIPTION OF THE PREFERRED EMBODIMENTS

Preferred embodiments of the present invention will be described with reference to the accompanying drawings.

Figure 1:
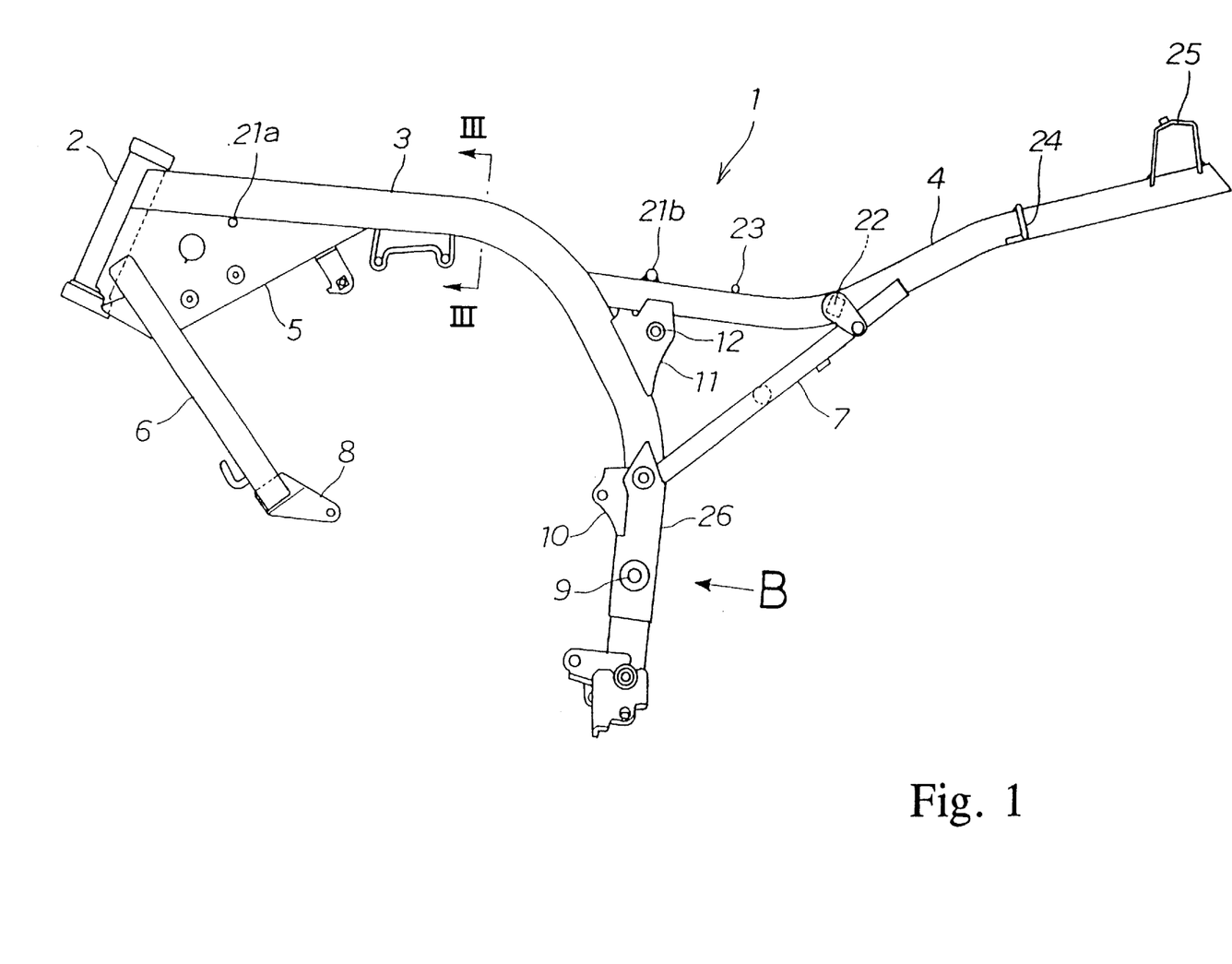
FIG. 1 is a side view of a body frame in a first embodiment according to the present invention.

Referring to FIG. 1 showing a body frame 1 in a first embodiment according to the present invention in a side view, the body frame includes, as principal components, a main pipe 3 extending rearwardly from a head pipe 2 for supporting a front fork, and a seat rail 4 extends rearwardly from the main pipe 3. A pair of down tubes 6 extend downwardly on the opposite sides of the longitudinal axis of the motorcycle, respectively, from a gusset plate 5 extending across the head pipe 2 and the main pipe 3. A pair of stay pipes 7 extend between a lower portion of the main pipe 3 and the seat rails 4 on the opposite sides of the longitudinal axis to support the seat rail 4. Each down tube 6 is formed by working a rectangular pipe and each stay pipe 7 is formed by working a rectangular pipe. Front hangers 8 are provided for supporting an engine at a front portion. The front hangers 8 are attached to the lower ends of the down tubes 6.

The main pipe 3, formed by working a rectangular pipe, extends rearwardly from the head pipe 2. A rear portion of the main pipe 3 is curved downwardly at a bend. A pivotal bearing portion 9 and rear hangers 10 for supporting the engine at a rear portion are attached to the lower end of the rear portion of the main pipe 3. The seat rail 4 is formed by working a rectangular pipe. The seat rail 4 extends rearwardly from a portion of the main pipe 3 near the bend. Gusset plates 11 extend across the main pipe 3 and the seat rail 4. Support member 12 for supporting rear shock absorbers are attached to the gusset plates 11.

Figure 2:
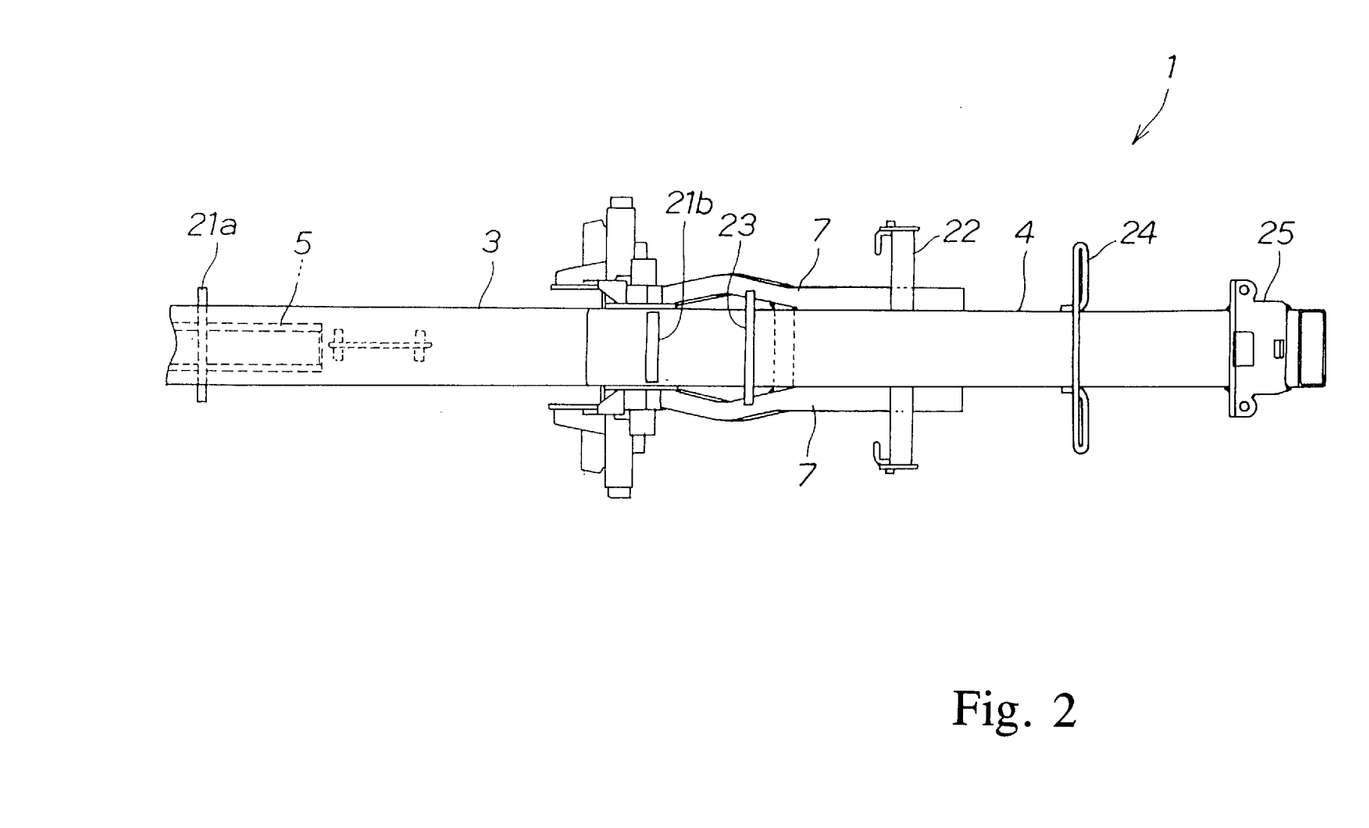
FIG. 2 is a plan view of the body frame of FIG. 1.

Referring to FIG. 2 showing the body frame 1 in a plan view, each of the main pipe 3 and the seat rail 4, i.e., essential components of the body frame 1, is a single pipe curving in a vertical plane including the longitudinal axis. Therefore, the body frame 1 has a simple planar framing. Each of the parallel stay pipes 7 is formed by working a rectangular pipe. The stay pipes 7 support the seat rail 4. The stay pipes 7 are bent in an outwardly convex shape so that the same may not interfere with rear shock absorbers provided in a vertical plane including the longitudinal axis. The body frame 1 has a relatively small lateral size and has a slim shape.

Figure 3:
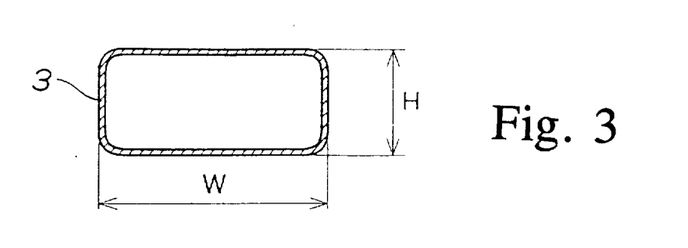
FIG. 3 is a sectional view taken on line III—III in FIG. 1.

FIG. 3 is a sectional view taken on line III—III in FIG. 1. The main pipe 3 is a flat pipe having a transversely elongated, rectangular cross section. More specifically, the width W of the transversely elongated cross section of the main pipe 3 is about 1.7 to about 2.2 times the height H of the same. The transverse bending rigidity and the torsional rigidity of the flat pipe having the rectangular cross section are about 5 to about 10 times those of a square pipe having a square cross section. The seat rail 4 has a cross section similar to that of the main pipe 3. Thus, the body frame 1 formed by joining together the pipes of such cross sections in a planar framing has a transverse bending rigidity and a torsional rigidity equivalent to those of the component members.

Since the body frame 1 is constructed by joining together the pipes extending in a vertical plane including the longitudinal axis of the motorcylce in a planar framing, the body frame 1 does not need any cross members for interconnecting parallel pipes. Thus the body frame can be easily completed by assembling a relatively small number of members. Thus, the body frame 1 has a simple framing and a high transverse bending rigidity and a high torsional rigidity.

Figure 4:
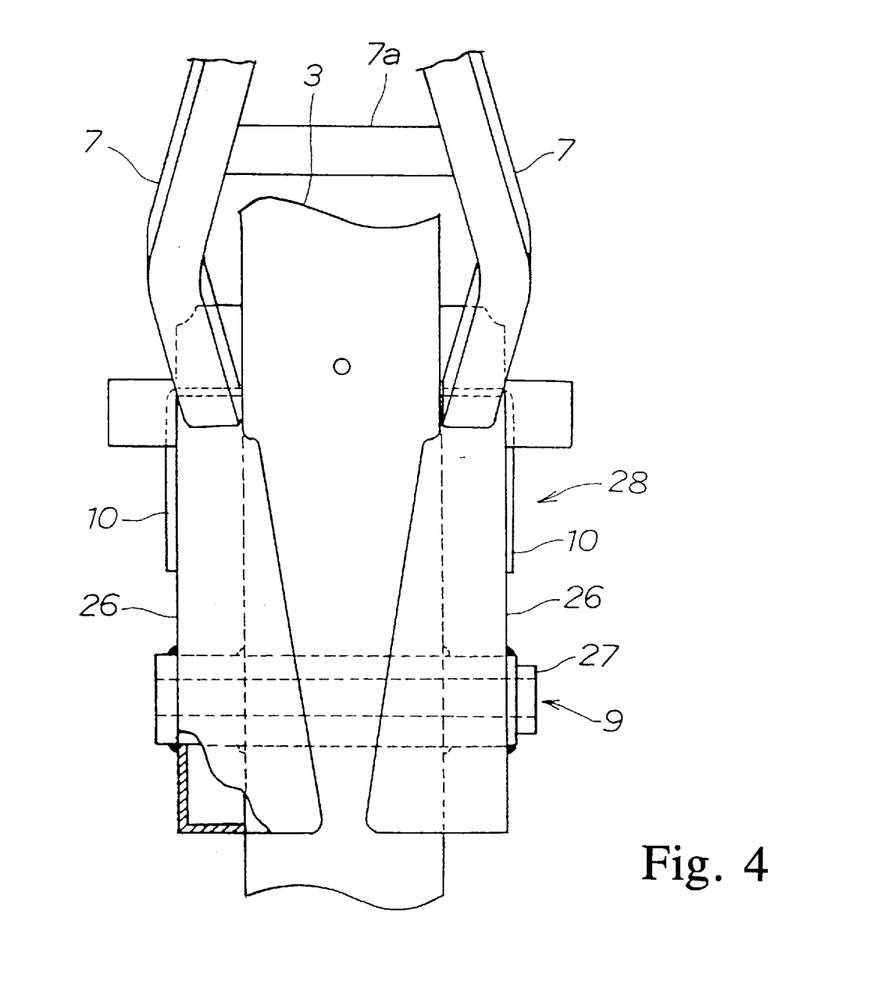
FIG. 4 is a sectional view taken along the arrow B in FIG. 1.

FIG. 4 is a view taken along the arrow B in FIG. 1. Substantially U-shaped plates 26 are attached to the opposite sides of the lower portion of the main pipe 3, respectively, to form a boxlike part 28, the lower ends of the stay pipes 7 are fixed to the upper ends of the boxlike part 28, the rear hangers 10 are attached to the opposite side surfaces of the boxlike part 28. A bearing pipe 27 extends through and across the boxlike part 28 to form a pivotal bearing part 9. A cross member 7a extends between the stay pipes 7.

Figure 5:
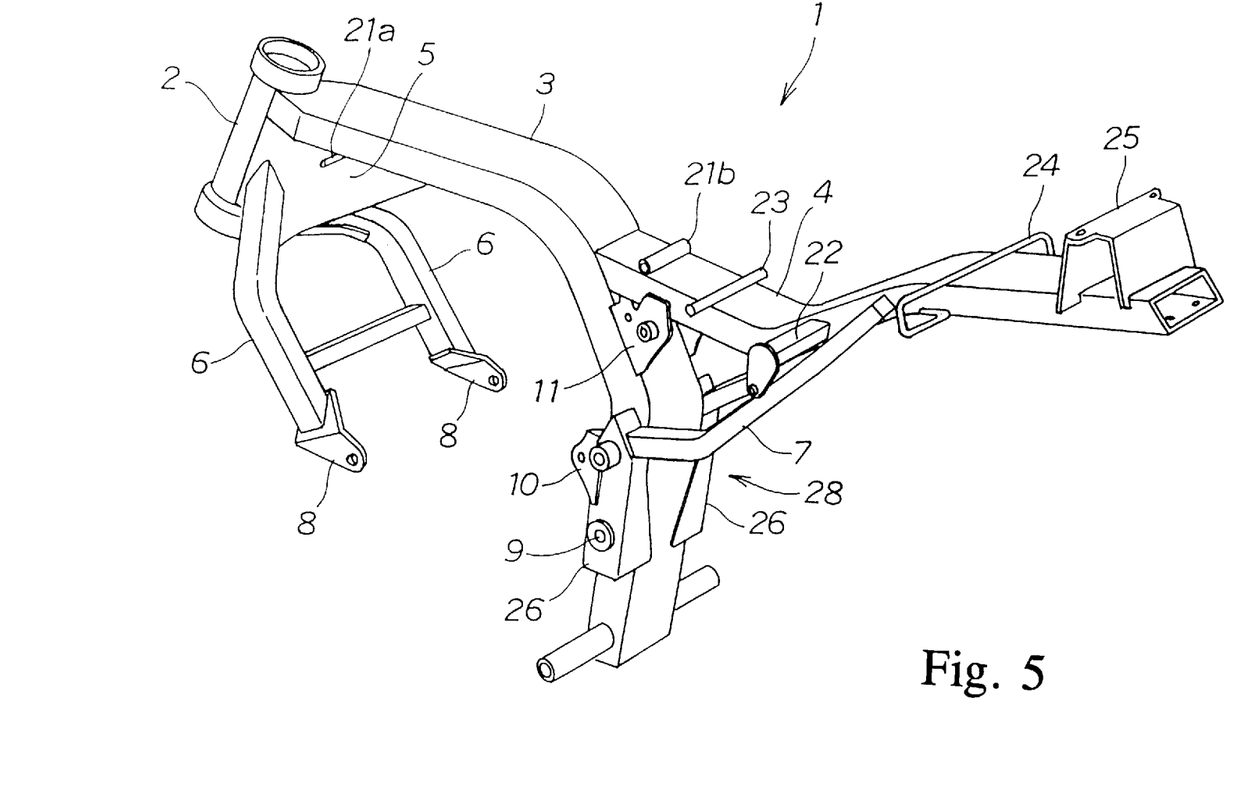
FIG. 5 is a perspective view of the body frame of FIG. 1.

Referring to FIG. 5 showing the body frame 1 of FIG. 1 in a perspective view, fuel tank mounting members 21a and 21b, a seat support member 22, a front seat retaining member 23, a rear seat retaining member 24 and a seat locking member 25 are attached to the main pipe 3 and the seat rail 4 formed by working the rectangular pipes having transversely elongate cross sections. The members can be easily attached to the flat surfaces of the rectangular pipes without requiring special fixing jigs for fixedly positioning the members on the main pipe 3 and the seat rail 4, respectively.

Figure 6:
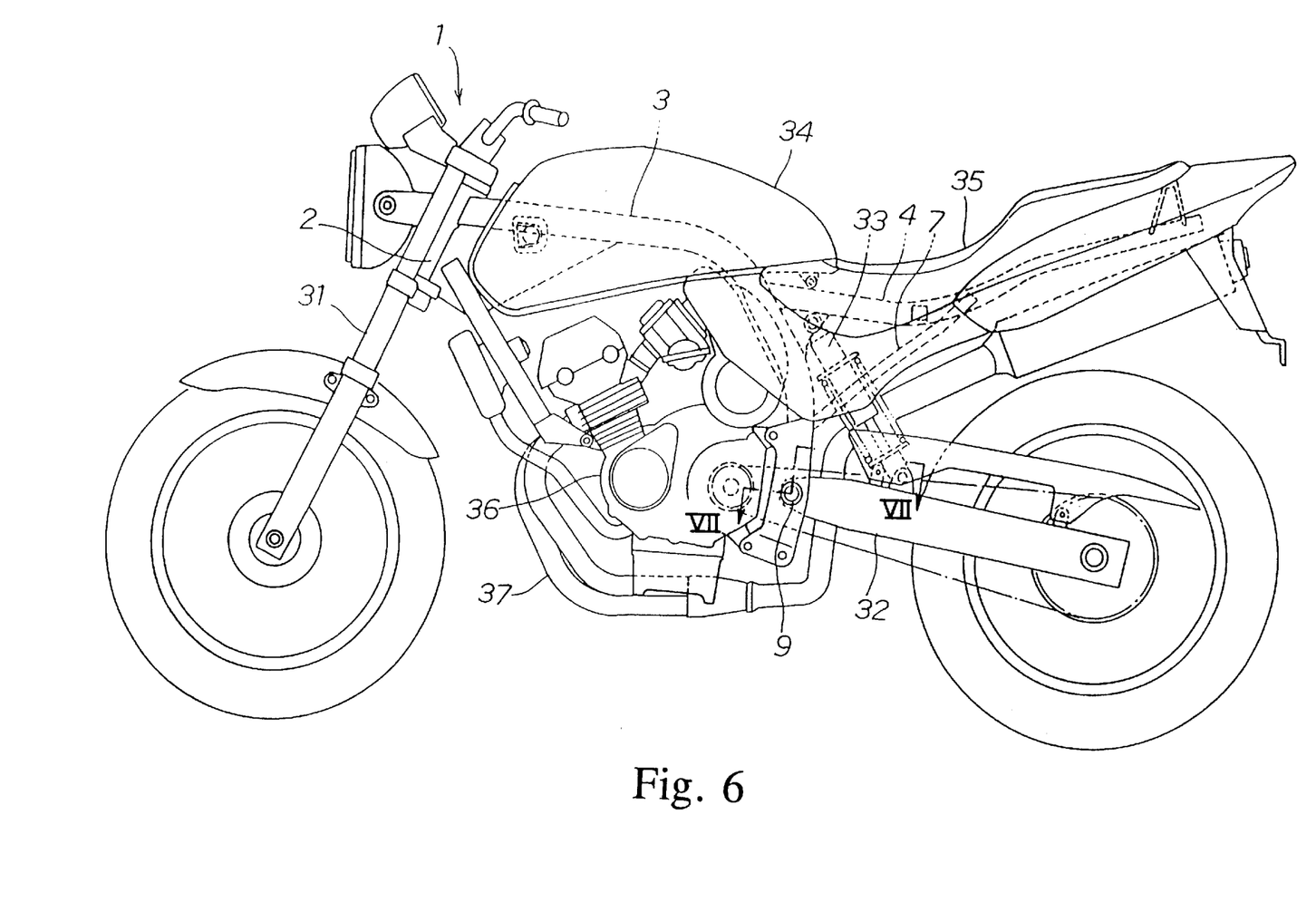
FIG. 6 is a side view of a motorcycle employing the body frame of FIG. 1.

Referring to FIG. 6 showing a motorcycle employing the body frame of FIG. 1 in a side view, a front fork 31 is supported on the head pipe 3 of the body frame 1, a rear swing arm 32 is supported on the pivotal bearing part 9, shock absorbers 33 are connected to the rear swing arm 32 to support the body frame 1 at a rear portion. A fuel tank 34 and a seat 35 are mounted on the body frame 1. An engine 36 and an exhaust pipe 37 are supported under the body frame 1.

Figure 7:
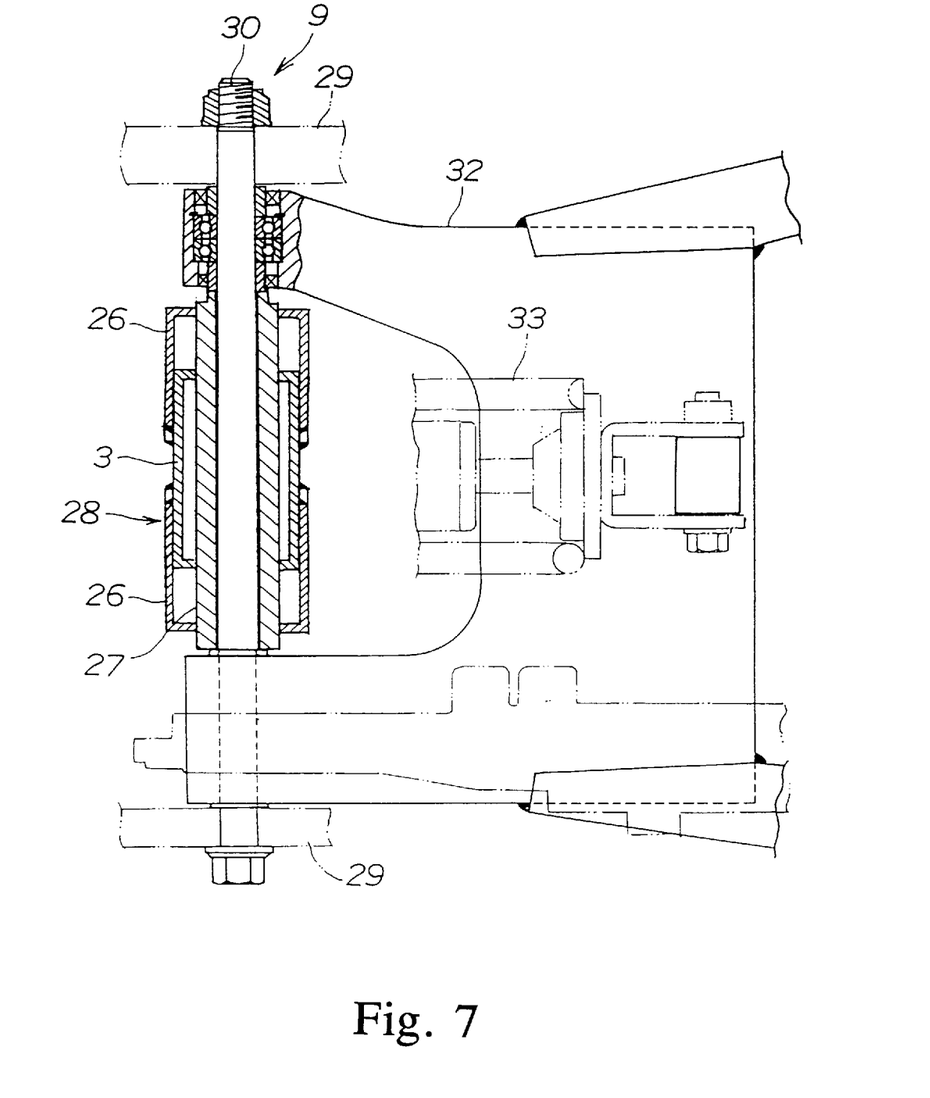
FIG. 7 is a sectional view taken on line VII—VII in FIG. 6.

FIG. 7 is a sectional view taken on line VII—VII in FIG. 6. The pivotal bearing part 9 has the bearing pipe 27 held on the boxlike part 28 with a bolt 30 extending through the bearing pipe 27 and the plates 26. The rear swing arm 32 is supported pivotally on the bolt 30. The plates 26 forming the boxlike part 28 are secured with a sufficiently high rigidity capable of withstanding bending in a vertical plane and twisting in a horizontal plane for the boxlike part 28.

The body frame 1 of the motorcycle thus constructed has the main pipe and the seat rail formed by working rectangular pipes each having a laterally elongate cross section. Therefore, the main frame has a simple planar framing, and ensures transverse bending and torsional rigidities capable of withstanding transverse bending and torsional forces.

Thus, a body frame having a high rigidity required by middle-size and large-size motorcycles can be easily constructed at a relatively low manufacturing cost.

Figure 8:
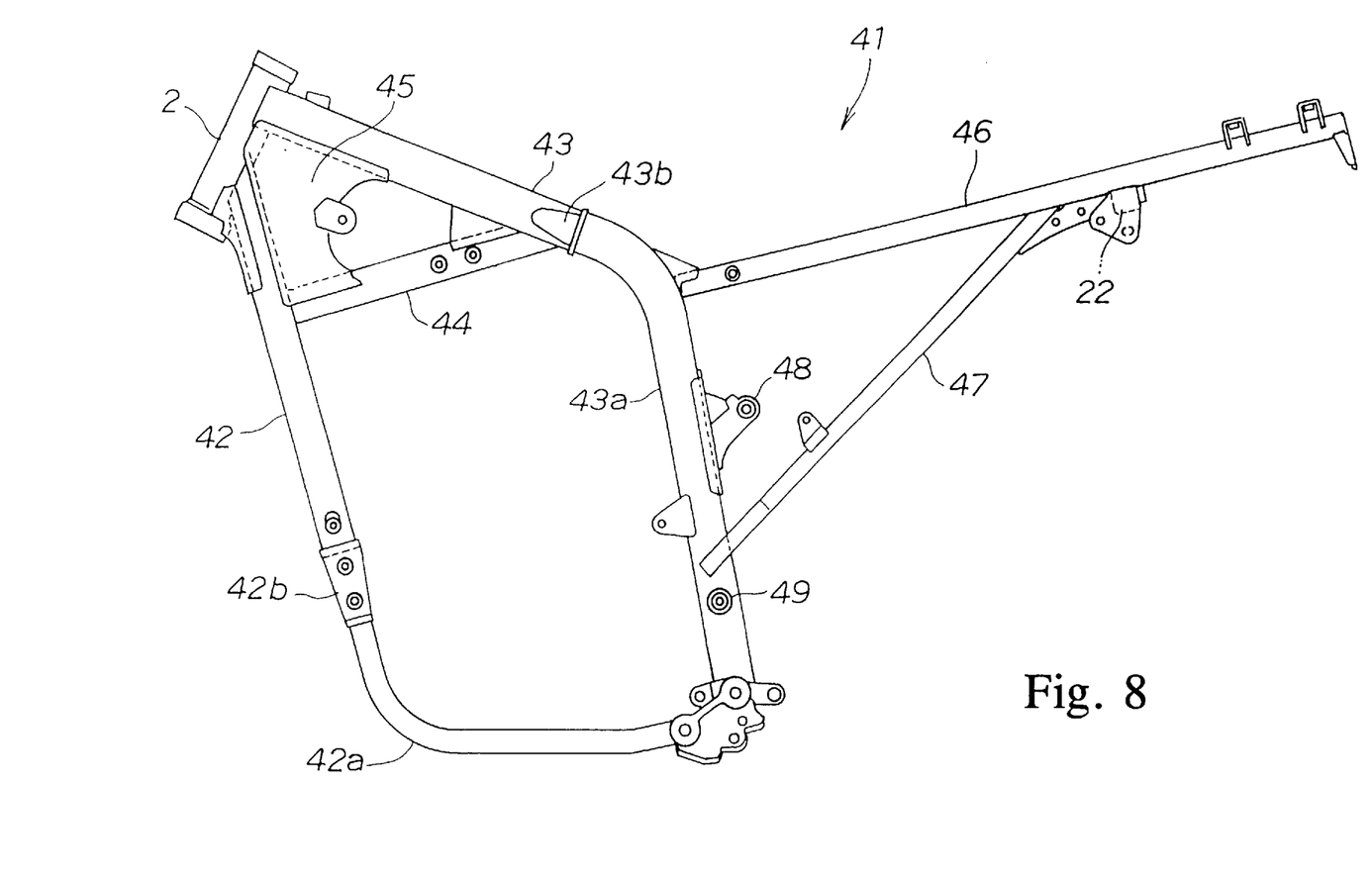
FIG. 8 is a side view of a body frame in a second embodiment according to the present invention.

FIG. 8 illustrates a side view of a body frame 41 according to a second embodiment of the present invention. The body frame 41 has a down tube 42 extending downwardly from a head pipe 2 and having a lower portion 42a curved so as to extend rearwardly. A main pipe 43 extends rearwardly from the head pipe 2 and includes a rear portion curved downwardly. The lower rear end of the down tube 42 is joined to the lower end of the main pipe 43 to form a cradlelike frame unit. A round pipe 44 extends between the down tube 42 and the main pipe 43. The joint of the head pipe 2, the down tube 42 and the main pipe 43 is reinforced by a gusset plate 45.

A straight seat rail 46 which is formed by working a rectangular pipe extends rearwardly from a portion of the main pipe 43 near a bend in the main pipe 43. Stay pipes 47 extend between the seat rail 46 and a rear down portion 43a of the main pipe 43 to support the seat rail 46. The lower front ends of the stay pipes 47 are fixed to the opposite side surfaces of the rear down portion 43a of the main pipe 43. Rear shock absorber support members 48 are attached to the rear down portion 43a of the main pipe 43 at a position above the lower front ends of the stay pipes 47. A pivotal bearing part 49 is formed in the lower down portion 43a of the main pipe 43 at a position below the lower front ends of the stay pipes 47.

The down tube 42 and the main pipe 43 are formed by working square pipes having substantially square cross sections, respectively. The seat rail 46, the lower portion 42a of the down tube 42 and the rear down portion 43a of the main pipe 43 are formed by working rectangular pipes each having a transversely elongate, rectangular cross section. The width of the cross section of each of the rectangular pipes is 2 to 3 times the height of the same.

A taper portion 42b having a continuously varying cross section, i.e., a continuously varying width and a continuously varying height, is formed between the upper front portion and the lower portion 42a of the down tube 42 to avoid stress concentration in any portion of the down tube 42. Similarly, joint plates 43b, each being formed substantially in a triangular shape, are attached to the joint of the front portion and the rear down portion 43a of the main pipe 43. The taper portion 42b and the joint plates 43b enables the use of rectangular pipes having rectangular portions having increased widths, respectively, to secure a necessary rigidity of the body frame 41.

Figure 9:
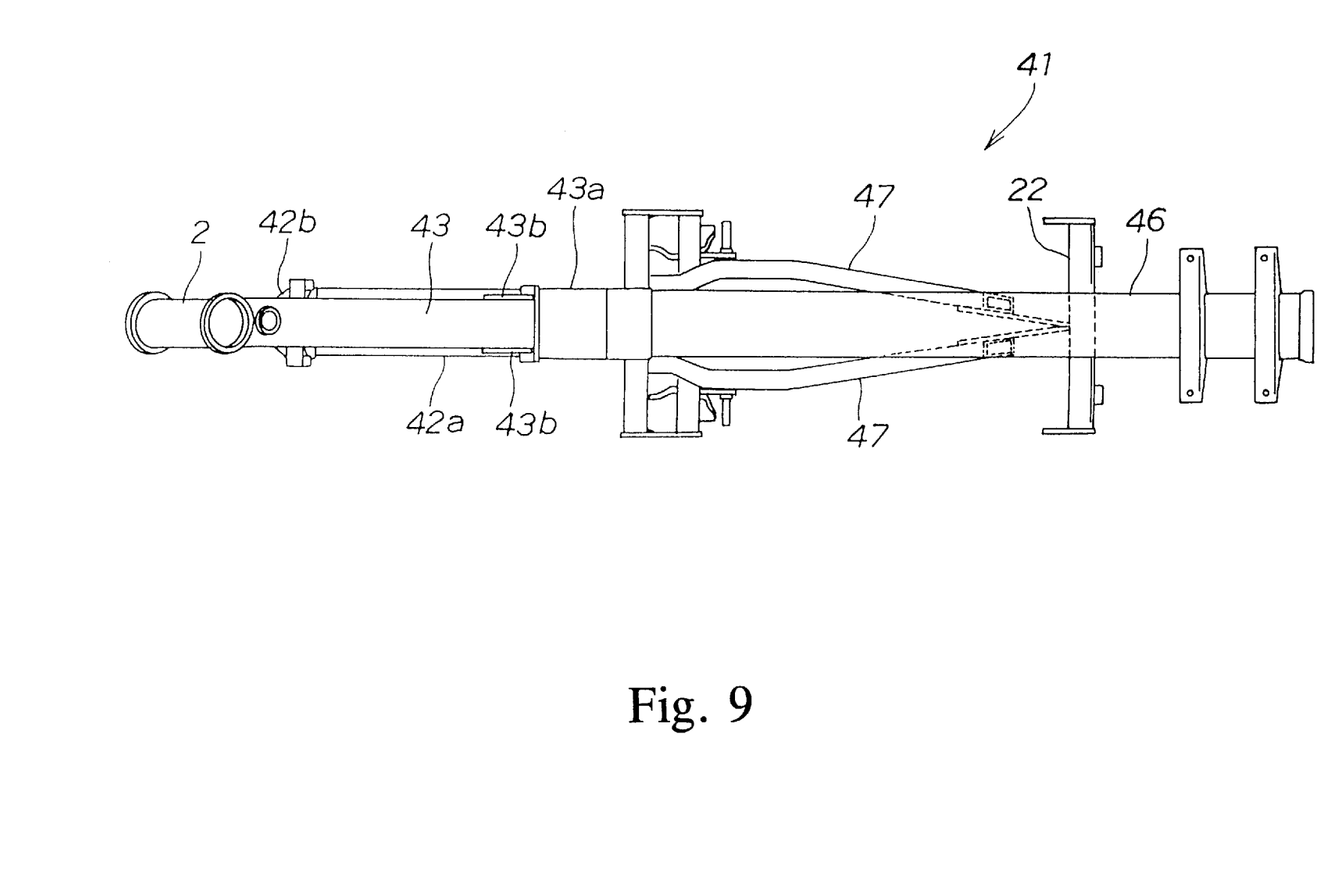
FIG. 9 is a plan view of the body frame of FIG. 8.

Referring to FIG. 9 showing the body frame 41 of FIG. 8 in a plan view, the rectangular pipes forming the down tube 42, the main pipe 43 and the seat rail 46 extend in a vertical plane including the longitudinal axis of the motorcycle to form the body frame 41 in a planar shape. The stay pipes 47 are formed by working two rectangular pipes and are bent in an outwardly convex shape so that the same may not interfere with the rear shock absorbers. The stay pipes 47 support the seat rail 46. The body frame 41 has a relatively small lateral size and has a slim shape.

Figure 10:
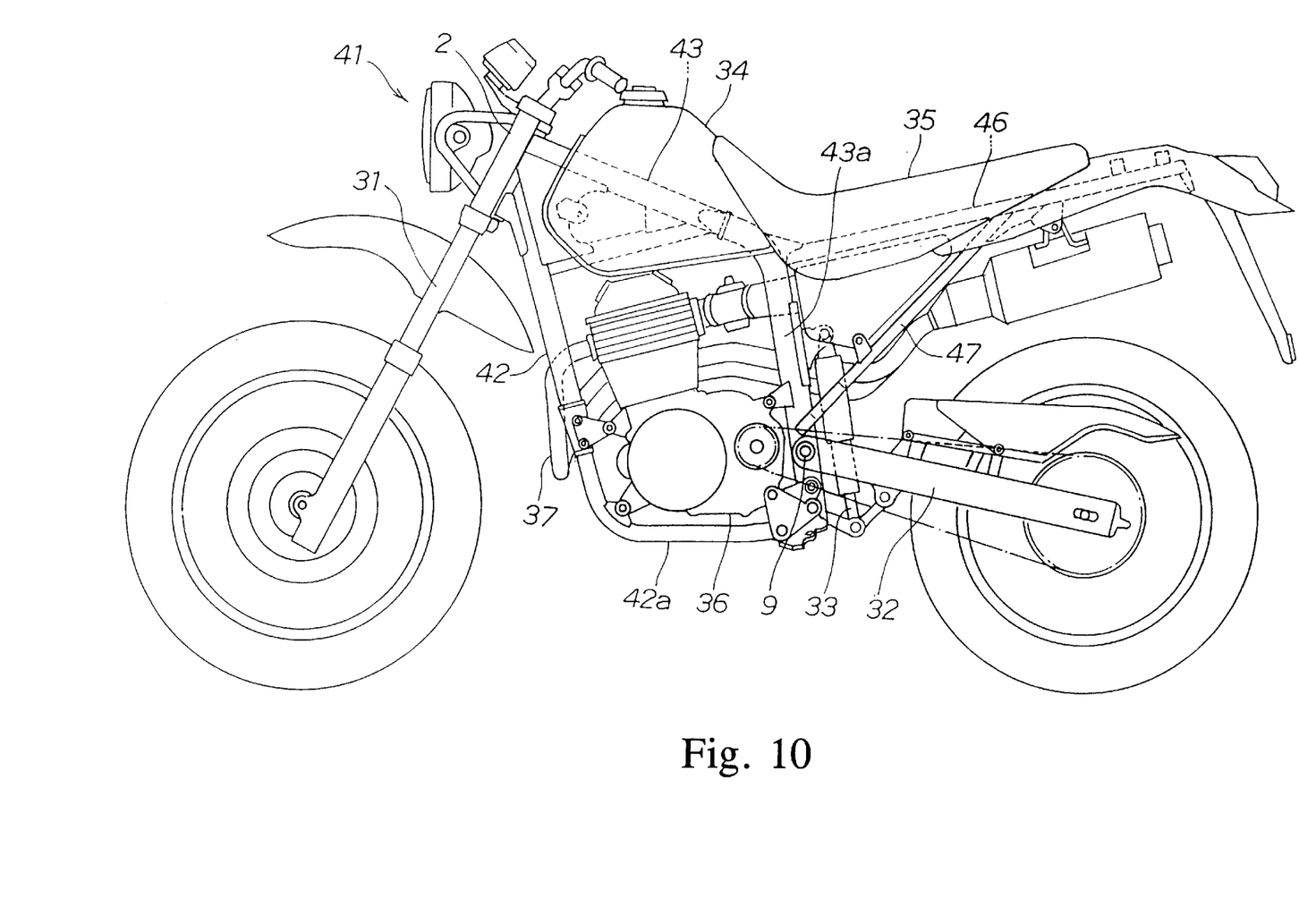
FIG. 10 is a side view of a motorcycle employing the body frame of FIG. 8.

FIG. 10 illustrates a side view of a motorcycle employing the body frame 41 of FIG. 8. An engine 36 is mounted on the cradlelike body frame 41 having the lower portion 42a having an increased width, and a front fork 31 and a rear swing arm 32 are supported on the body frame 41. Shock absorbers 33 extend between the rear swing arm 32 and the body frame 41 to support the rear portion of the body frame 41. A fuel tank 34, a seat 35 and the component parts of the motorcycle are mounted on the body frame 41 to construct the motorcycle.

The cradlelike body frame 41 is built by assembling the main pipe 43, the seat rail 46 and the down tube 42 formed by working rectangular pipes. The body frame 41 extends in a vertical plane including the longitudinal axis with the widths thereof transversely extending in a simple planar framing. The body frame 41 reduces the load on the engine 36 and has a high rigidity capable of withstanding transverse bending and torsional forces.

Figure 11A:
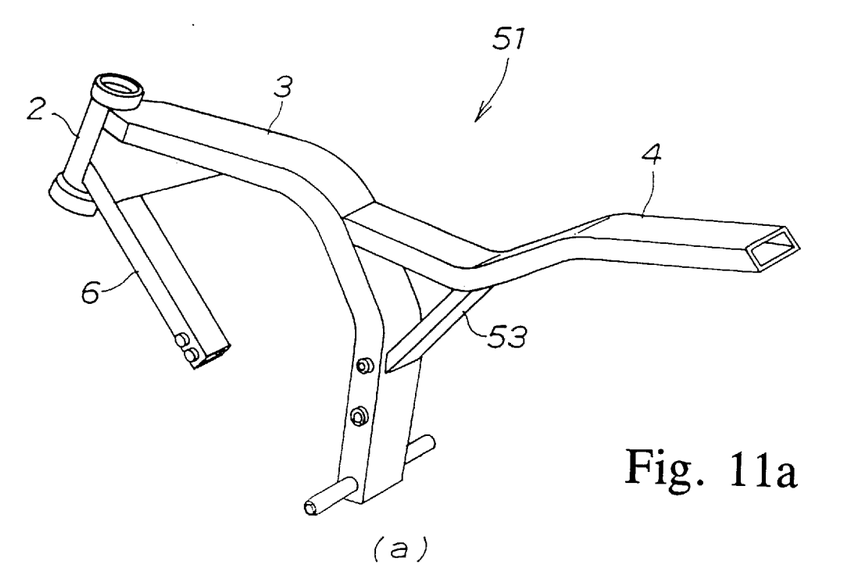
Figure 11B:
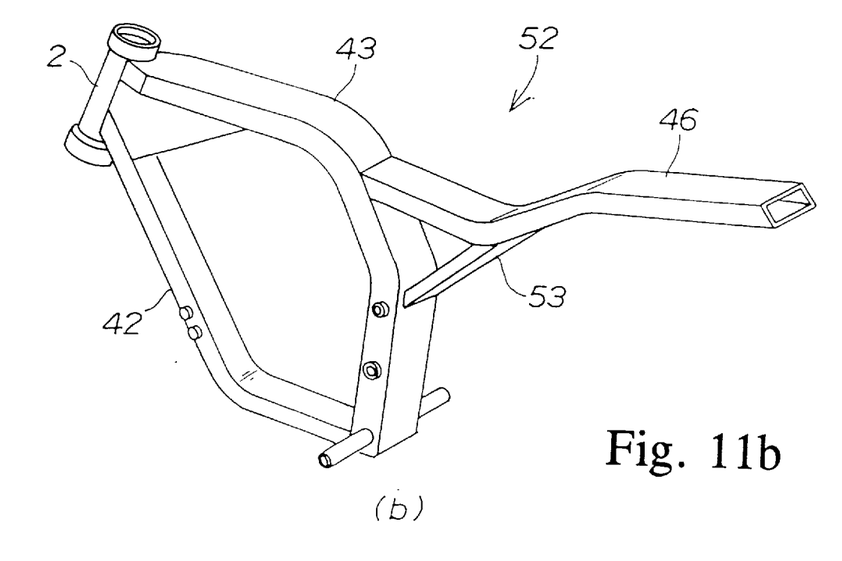

FIGS. 11(a) and 11(b) are perspective views of body frames 51 and 52 in modifications of the first and the second embodiments of the present invention, respectively. The body frame 51' (52) of FIG. 11(a)' (11(b)) has a stay pipe 53' (53) supporting a seat rail 4' (46) having a transversely elongate cross section and formed by working a rectangular pipe. The stay pipe 53' (53) extends between a main pipe 3' (43) and the seat rail 4' (46) in a vertical plane including the longitudinal axis. The body frames 51 and 52 each have a simple planar shape. A motorcycle employing the body frame 51 or 52 may be provided with one rear shock absorber disposed on one side of the stay pipe 53.

Figure 12:
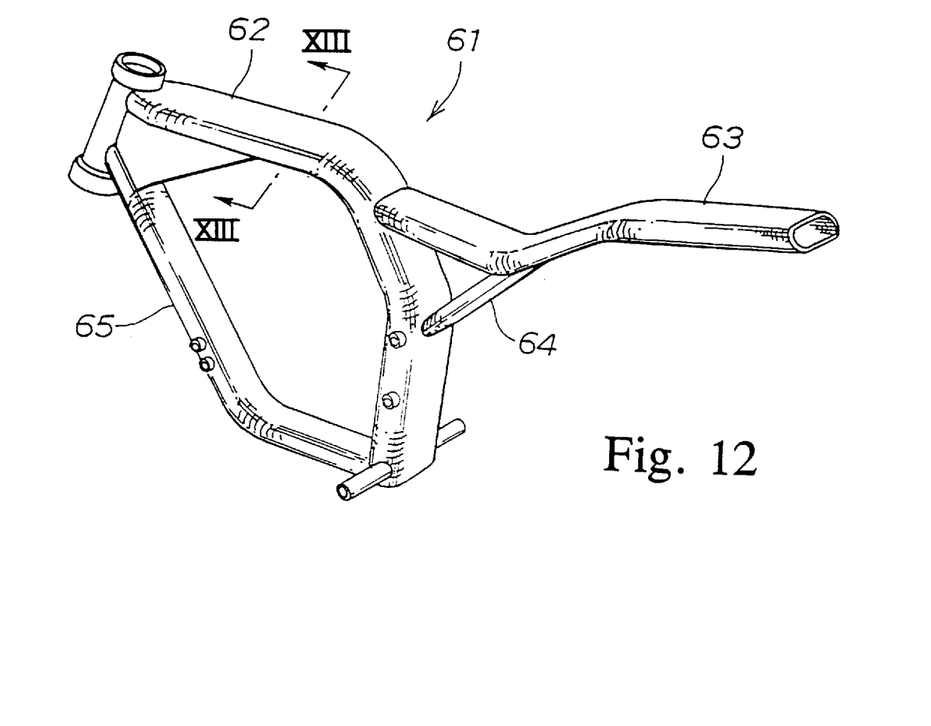
FIG. 12 is a perspective view of a body frame in another modification of the embodiment of the present invention.
Figure 13:
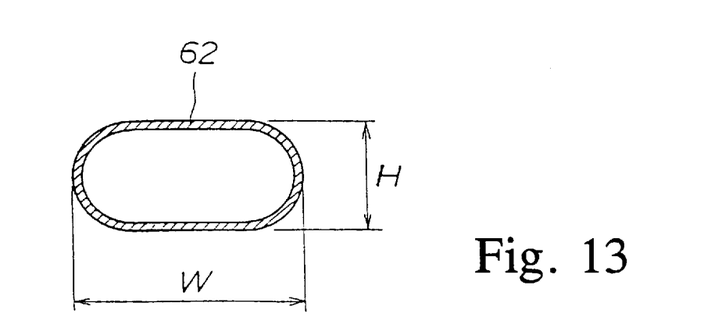
FIG. 13 is a section view taken on line XIII—XIII in FIG. 12.

FIG. 12 is a perspective view of a further modification of the foregoing embodiments of the present invention. FIG. 13 is a sectional view taken on line XIII–XIII in FIG. 12. The body frame 61 includes a main pipe 62, a seat rail 63 joined to a rear portion of the main pipe 62, a stay pipe 64 and a down tube 65 extending under the main pipe 62. Each of these members of the body frame 61 is formed by working a flat pipe having an elliptic cross section.

The width W, i.e., the transverse size, of the elliptic cross section of each flat pipe is greater than the height H of the same. Use of the flat pipes secures a necessary rigidity for the body frame 61. The flat upper and the flat lower surfaces of the flat pipes facilitate work for attaching the component parts of the motorcycle to the body frame 61. The round side walls of the flat pipes enable a characteristic design.

Since the rigidity of each of the foregoing body frames is dependent on the transverse bending rigidities and the torsional rigidities of the component members, the component members may be formed from flat pipes of any suitable cross section. Therefore, a pipe having an elliptic cross section has the same effect as that of a pipe having a rectangular cross section in obtaining the necessary rigidity for the body frame. Since it is obvious that a body of a planar shape for a motorcycle can be formed by employing a body frame including pipes each having a round cross section, the description of such a body frame will be omitted.

As is apparent from the foregoing description, since the body frame for a motorcycle includes a main pipe having a transversely elongate cross section extending in a vertical plane including the longitudinal axis, the body frame is easily constructed, has a simple planar framing and has a high transverse bending rigidity and a high torsional rigidity.

Accordingly, the body frame capable of securing the rigidity required for the body of a middle-size or a large-size on-road motorcycle can be easily constructed. The body frame requires reduced processing work and has a reduced number of component parts.

The body frame for a motorcycle includes a seat rail connected to the rear portion of the main pipe so as to extend rearwardly from the main pipe. The body frame has a transversely elongated cross section and extends in a vertical plane including the longitudinal axis of the motorcycle. The body frame including the seat rail can be easily constructed in a planar framing and has a high transverse bending rigidity and a high torsional rigidity.

The body frame for a motorcycle includes down tubes for supporting the engine at its front end, connected to the main pipe. The body frame includes a transversely elongated cross section and extends downwardly from the head pipe in a vertical plane including the longitudinal axis of the motorcycle. The body frame including the down tubes has a simple planar framing and has a highly transverse bending rigidity and a high torsional rigidity. FIG. 13 is a sectional view taken on line XIII—XIII in FIG. 12.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A body frame for a motorcycle comprising:

a head pipe for pivotally supporting a front fork;

a main pipe extending from said head pipe, said main pipe being curved to extend rearwardly and downwardly; and a pivot unit secured to said downwardly extending portion of said main pipe for pivotally supporting a rear swing arm thereon;

said main pipe extends in a predetermined transversely elongated cross section from said head pipe to said pivot unit in a vertical plane including a longitudinal axis of the motorcycle.

2. The body frame for a motorcycle according to claim 1, and further including a seat rail for supporting a seat, said seat rail being connected to a rear portion of the main pipe and having a transversely elongated cross section extending in the vertical plane including the longitudinal axis of the motorcycle.

3. The body frame for a motorcycle according to claim 1, and further including down tubes for supporting a forward portion of an engine, said down tubes being connected to the main pipe include a transversely elongate cross section and extend downwardly from the head pipe in the vertical plane including the longitudinal axis of the motorcycle.

4. The body frame for a motorcycle according to claim 1, wherein said main pipe is rectangular in cross section with an elongated side of the rectangle being transverse to the longitudinal axis of the motorcycle.

5. The body frame for a motorcycle according to claim 1, wherein said main pipe is oval in cross section with an elongated portion of the oval being transverse to the longitudinal axis of the motorcycle.

6. The body frame for a motorcycle according to claim 3, and further including a gusset plate disposed adjacent to said head pipe and connecting said main pipe with said down tubes for increasing the rigidity of the body frame.

7. The body frame for a motorcycle according to claim 3, and further including front hangers secured to said down tubes for mounting to said forward portion of an engine.

8. The body frame for a motorcycle according to claim 2, and further including stay members secured to and extending from a lower portion of said main pipe to said seat rail for increasing the rigidity of the body frame.

9. The body frame for a motorcycle according to claim 2, and further including a gusset plate secured to and extending from said main pipe to said seat rail for increasing the rigidity of the body frame.

10. The body frame for a motorcycle according to claim 1, wherein the pivot unit includes a bearing pipe extending through said main pipe, a bolt mounted within said bearing pipe for supporting the rear swing arm for supporting a rear wheel and plates mounted on said main pipe for increasing the rigidity of the pivot unit.

11. The body frame for a motorcycle according to claim 1, wherein a center of the entire main pipe lines in the same vertical plane coincident with the longitudinal axis of the motorcycle.

12. A body frame for a motorcycle comprising:
a head pipe for pivotally supporting a front fork;
a main pipe having a first end, a middle portion and a second end, said first end being secured to said head pipe, said middle portion extending rearwardly therefrom and said second end extending downwardly from said middle portion of said head pipe;
a pivot unit secured to said downwardly extending portion of said main pipe for pivotally supporting a rear swing arm thereon;
said main pipe having a transversely elongated cross section having a width being longer relative to a height portion thereof, said main pipe extends in a vertical plane coincident with a longitudinal axis of the motorcycle.

13. The body frame for a motorcycle according to claim 12, and further including a seat rail for supporting a seat, said seat rail being connected to a rear portion of the main pipe and having a transversely elongated cross section extending in the vertical plane including the longitudinal axis of the motorcycle.

14. The body frame for a motorcycle according to claim 12, and further including down tubes for supporting a forward portion of an engine, said down tubes being connected to the main pipe include a transversely elongate cross section and extend downwardly from the head pipe in the vertical plane including the longitudinal axis of the motorcycle.

15. The body frame for a motorcycle according to claim 12, wherein said main pipe is rectangular in cross section with an elongated side of the rectangle being transverse to the longitudinal axis of the motorcycle, the width of the rectangle being 1.7 to 2.2 times the height.

16. The body frame for a motorcycle according to claim 12, wherein said main pipe is oval in cross section with an elongated portion of the oval being transverse to the longitudinal axis of the motorcycle.

17. The body frame for a motorcycle according to claim 14, and further including a gusset plate disposed adjacent to said head pipe and connecting said main pipe with said down tubes for increasing the rigidity of the body frame.

18. The body frame for a motorcycle according to claim 14, and further including front hangers secured to said down tubes for mounting to said forward portion of an engine.

19. The body frame for a motorcycle according to claim 13, and further including stay members secured to and extending from a lower portion of said main pipe to said seat rail for increasing the rigidity of the body frame.

20. The body frame for a motorcycle according to claim 13, and further including a gusset plate secured to and extending from said main pipe to said seat rail for increasing the rigidity of the body frame.

21. The body frame for a motorcycle according to claim 13, wherein the pivot unit includes a bearing pipe extending through said main pipe, a bolt mounted within said bearing pipe for supporting the rear swing arm for supporting a rear wheel and plates mounted on said main pipe for increasing the rigidity of the pivot unit.

* * * * *